United States Patent [19]

Tsuda et al.

[11] Patent Number: 4,785,863

[45] Date of Patent: Nov. 22, 1988

[54] PNEUMATIC RADIAL TIRE WITH ASYMMETRIC TREAD

[75] Inventors: Toru Tsuda; Toshio Hayakawa, both of Higashimurayama, Japan

[73] Assignee: Bridgestone Corporation, Tokyo, Japan

[21] Appl. No.: 114,341

[22] Filed: Oct. 30, 1987

[30] Foreign Application Priority Data

Nov. 7, 1986 [JP] Japan .................................. 61-264085

[51] Int. Cl.$^4$ .............................................. B60C 11/08
[52] U.S. Cl. .............................. 152/209 A; 152/209 R
[58] Field of Search .......... 152/209 R, 209 A, 209 D, 152/209 B; D12/136, 141-151

[56] References Cited

U.S. PATENT DOCUMENTS

| | | | |
|---|---|---|---|
| 3,286,756 | 11/1966 | Ellenrieder et al. | 152/209 A |
| 4,057,089 | 11/1977 | Johannsen | 152/209 R |
| 4,721,141 | 1/1988 | Collette et al. | 152/209 A |
| 4,726,407 | 2/1988 | Hayakawa et al. | 152/209 R |

FOREIGN PATENT DOCUMENTS

| | | | |
|---|---|---|---|
| 783415 | 4/1968 | Canada | 152/209 A |
| 152607 | 9/1983 | Japan | 152/209 A |

Primary Examiner—Michael W. Ball
Assistant Examiner—Geoffrey L. Knable
Attorney, Agent, or Firm—Sughrue, Mion, Zinn, Macpeak & Seas

[57] ABSTRACT

To improve steering controllability and stability, radial tire treads are usually formed with a plurality of inclination grooves arranged on both sides of a tire tread at regular intervals along a tire circumference and extending from both tread ends to a main central circumferential groove at an acute angle with respect to tire equator so as to converge to the tire outer circumference. To further improve the steering controllability and stability on both dry and wet roads, the inclination grooves are formed asymmetrical on both sides of the tie tread. The inclination grooves with a large pitch length $P_1$ and a small inclination angle $\alpha_1$ are effective on dry roads, while those with a small pitch length $P_2$ and a large angle $\alpha_2$ are effective on wet roads.

7 Claims, 1 Drawing Sheet

PNEUMATIC RADIAL TIRE WITH ASYMMETRIC TREAD

BACKGROUND OF THE INVENTION

1. Field of the Invention

The present invention relates to a pneumatic radical tire and more specifically to a novel tread pattern of a pneumatic radial tire, which can improve steering controllability and stability on both dry and wet roads.

2. Description of the Prior Art

Conventionally, tire tread patterns can be classified into three, rib, block and combination, types. Further, the tire tread pattern is formed into various ways as in line symmetry, point symmetry and asymmetry with respect to the tire equator. In conventional tire tread patterns, however, the patterns have so far been improved under consideration of steering controllability and stability on dry or wet road, separately. Therefore, when the steering controllability and stability have been improved for wet roads, there exists a problem in that the controllability and stability are not satisfactory on dry roads, or vice versa.

The above problem may of course be solved by changing the tires according to weather; however, drivers usually use only a single kind of tire until the tires are worn out for further use.

SUMMARY OF THE INVENTION

With these problems in mind, therefore, it is the primary object of the present invention to provide a pneumatic radial tire which can improve steering controllability and stability on both dry and wet roads.

The present invention is based upon the conception such that two different tread patterns having different tire characteristics are formed separately, on both the sides of the tire tread in such a way one pattern is suitable for use on a dry road and the other pattern is suitable for use on a wet road. In particular, the rigidity of the tire land portion partitioned by inclination grooves is different between both the sides of the tire tread by modifying a pitch length and an inclination angle of the inclination grooves with respect to the tire equator.

The tire pattern having inclination grooves with a large pitch length and a small inclination angle (wide land area or high rigidity) is effective on dry roads, while the tire pattern having inclination grooves with a small pitch length and a large inclination angle (narrow land area or low rigidity) is effective on wet roads.

To achieve the above-mentioned object, a pneumatic radial tire, according to the present invention, having a radial carcass extending between two tire sidewalls through a tire crown portion in toroidal shape; a belt layer arranged alone on outer circumference of a crown portion of the carcass; and a tread rubber formed with at least one main circumferential groove located at a central portion of the tread substantially in parallel to a tire equator, a plurality of inclination grooves arranged on both sides of a tire tread at substantially regular intervals along a tire circumference and extending from both tread ends toward the main circumferetial groove so as to intersect lines parallel to the tire equator at an acute angle and converge to a tire outer circumference, and tire land portions partitioned by the main and inclination grooves, is characterized in that $P_1/P_2$ lies within a range between 1.5 and 3.0 and $\alpha_2$ is greater than $\alpha_1$, where $P_1$ denotes a first circumferential pitch length of first inclination grooves and $\alpha_1$ denotes a first averge inclination angle of the first inclination grooves with respect to the line parallel to the tire equator both in a first tire tread area defined between the main circumferential groove and a first tread end; and $P_2$ denotes a second circumferential pitch length of second inclination grooves and $\alpha_2$ denotes a second average inclination angle of the second inclination grooves with respect to the line parallel to the tire equator both in a second tire tread area defined between the main circumferential groove and a second tread end.

The inclination angle $\alpha_1$ is 15 to 40 degrees and $\alpha_2$ is 25 to 80 degrees. Further, it is preferable to form a relatively narrow auxiliary groove parallel to the main circumferential groove in each land formed between the main groove and an axially innermost end of the inclination grooves in each of the first and second tire tread areas. Furthermore, to further decrease the rigidity on land portion suitable for use in wet road, it is also preferable to additionally form a relatively-narrow intermediate circumferential groove in parallel to the main groove so as to divided the inclination grooves along the tire axial direction. In this case, two respective inclination grooves bisected by the intermediate groove are offset from each other at each divided position.

BRIEF DESCRIPTION OF THE DRAWINGS

The features and advantages of the pneumatic radial tire according to the present invention will be more clearly appreciated from the following description of the preferred embodiment of the invention taken in conjunction with the accompanying drawing in which.

DETAILED DESCRIPTION OF THE PREFERRED EMBODIMENTS

Figure 1:
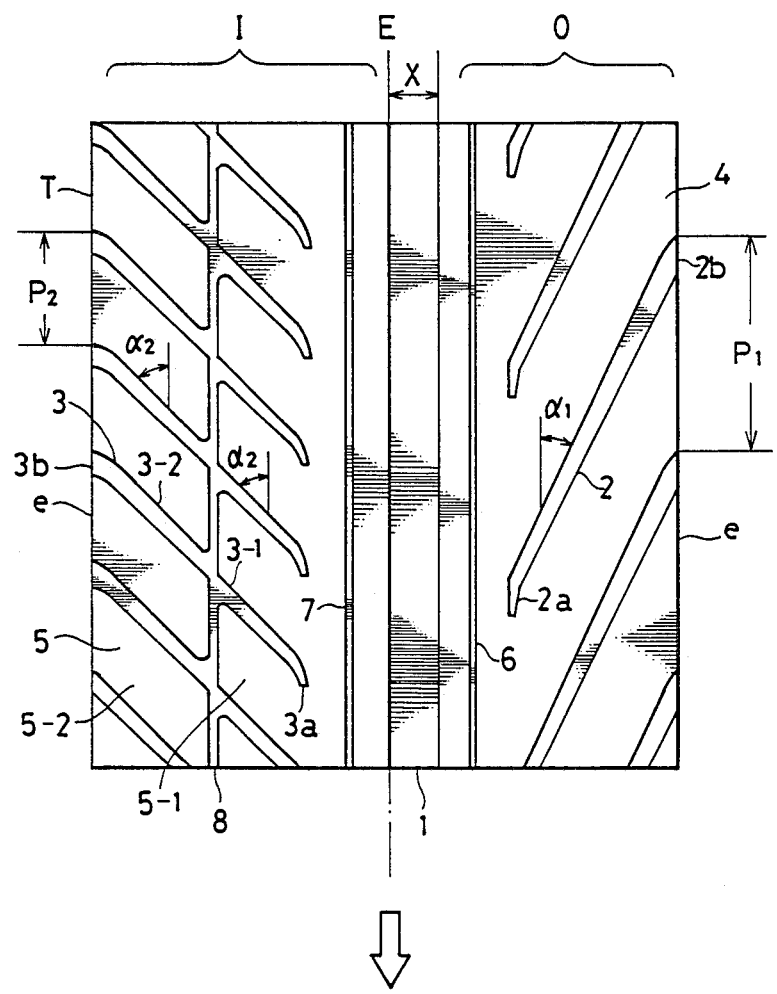
FIG. 1 is a partial plan view developed along the circumferential direction of a pneumatic radial tire for automotive vehicles according to the present invention.

FIG. 1 shows a tread pattern of a radial tire according to the present invention. Although not shown, the tire tread is formed between two sidewalls in toroidal shape passing through a tire crown portion as is usual. Each metallic bead core is implanted at the radially innermost end of each sidewall. The tire is roughly made up of a radial carcass composed of at least one radial ply formed by arranging fabric or metallic cords between the two bead cores in a direction substantially perpendicular to the tire equator and a belt layer composed of inextensible cords arranged along the outer circumferential direction of the carcass crown portion. In the belt layer, a plurality of plies are formed by arranging cord layers of high elastic modulus such as metal or aromatic polyamide fiber (known as KEVLAR in trademark) at a small inclination angle with respect to the tire circumferential direction so that cords of different belt layers are laid one upon another and intersect each other. The maximum width of the belt layer is substantially equal to the tread width of the tread consisting of rubber located on the radially outermost side of the belt layer. Further, the outer circumferential surface of the sidewalls is covered by a flexible rubber and the entire inner circumferential surface of the carcass is coated by an inner liner of air impermeability. The above structure is well known in pneumatic radial tires.

In the tire according to the present invention, the tread T is formed with a wide main circumferential groove 1 extending in the tire circumferential direction at the central portion of the tread, and is divided into two tread areas O and I between both tread ends e. In FIG. 1, a straight main groove 1 is shown. However, it is also possible to form this main groove 1 in zigzag or undulant fashion. In the embodiment shown in FIG. 1, since one groove wall (the leftside) of the main groove 1 is substantially located on the tire equator E, the width of the left area I is wider than that of the right area O by a width corresponding to that of the main groove 1. Both tread areas O and I extend to the tread ends e, respectively. The lands 4 and 5 in contact with a road during vehicle travelling are partitioned, respectively, by a plurality of inclination grooves 2 or 3.

A plurality of inclination grooves 2 or 3 are arranged, respectively on both sides of a tire tread at substantially regular intervals along a tire circumference and extend from both tread ends toward the main groove 1 so as to intersect lines parallel toward the tire equator at an acute angle. The grooves converge toward tire outer circumference.

In the embodiment shown in FIG. 1, each inclination groove 2 or 3 extends from each tread end e, respectively, over the middle of each area O and I, to near the main groove 1. However, it is also possible to connect the inclination grooves 2 or 3 with the main groove 1. In FIG. 1, the inclination grooves 2 or 3 are formed in a straight line; however, the innermost end $2a$ or $3a$ of the inclination grooves 2 or 3 is bent so that the inclination angle $\alpha_1$ or $\alpha_2$ decrease and the outermost end $2b$ or $3b$ of the inclination grooves 2 or 3 (on the tread end e) is bent so that the inclination angle $\alpha_1$ or $\alpha_2$ increases as shown. Although not shown, it is possible to bend the inclination grooves 2 or 3 into a bow shape in either side. In this case, the inclination angle $\alpha_1$ or $\alpha_2$ is expressed as an average inclination angle.

The inclination angle $\alpha_1$ lies between 15 and 40 degrees and $\alpha_2$ lies between 25 and 80 degrees; and preferably $\alpha_2 > \alpha_1$. Further, the width of the inclination groove increases gradually from the main groove (1) side to the tread end e, causing the convergence. The width of the inclination grooves 2 is wider than that of the inclination grooves 3 on average.

In the case of tires for automotive vehicles, the width of the grooves 2 (measured in a direction perpendicular to the longitudinal direction of the groove) is about 5 to 6 mm at the middle thereof, and the width of the grooves 3 is about 3 to 5 mm. However, it is preferable that the widths of both the inclination grooves 2 and 3 are narrower than that of the main groove 1.

The pitch length $P_1$ representative of spaces between two adjacent inclination grooves 2 on the area O is larger than that $P_2$ representative of spaces between two adjacent inclination grooves 3 on the area I. As illustrated in FIG. 1, the pitch length is measured at the tread edge in the circumferential direction from the edge of one groove to the same edge on an adjacent groove. A ratio of $P_1/P_2 = 1.5$ to 3.0. Therefore, the total areas of the grooves in contact with the road in the tread area I is broader than that in the area O.

When the space of the land portion formed between the main groove 1 and the innermost ends $2a$ and $3a$ of the inclination grooves 2 or 3 is large, although being dependent upon the length of the inclination grooves 2 or 3 toward the main circumferential groove 1 on both the area I or O, it is preferable to form a pair of relatively narrow circumferential auxiliary grooves 6 and 7 in parallel with the main groove 1 as shown. Further, when the groove area in the area I is required to increase, it is also possible to form a relatively narrow intermediate groove 8 at roughly the middle portion of the area I substantially in parallel to the main groove 1, so that the land portion can be divided into two outer and inner lands 5-1 and 5-2.

Further, in the present embodiment, the inclination grooves 3-1 extending into the inner land 5-1 are offset from the inclination grooves 3-2 extending into the outer land 5-2 at the position of the intermediate groove 8. The offset distance is about half of the width of the intermediate groove 8. That is, the central line of the inner inclination angle 3-1 is dislocated from the central line of the outer inclination angle 3-2 by a half of width of the intermediate groove 8 in the tire circumferential direction. However, this offset distance may be modified in a range of 0.25 to 1.0 of the intermediate groove (8) width. Further, the depth of the main circumferential groove 1 is the deepest, and those of the two inclination grooves 2 and 3, the auxiliary circumferential grooves 6 and 7, and the intermediate groove 8 are preferably equal to or a little shallower than that of the main groove 1.

In the above description, the following point should be noted. In the tread area O, since the inclination grooves 2 are formed coarsely as shown, the ratio of the tire land portion 4 to grooves 2, 6 is relatively large and therefore the rigidity of the land portion in the area O is high, so that this coarse pattern is suitable for use on dry roads. In contrast with this, in the tread area I, since the inclination grooves 2 are formed finely as shown, the tire land portion 5 is relatively narrow and therefore the rigidity of the land portion in the area I is low, so that this fine pattern is suitable for use on wet roads.

TEST RESULTS

To verify the effect of the present invention, the tread pattern of the present invention was applied to automotive vehicle tires 205/60R15, and the test tires were attached to passenger cars in order to effect practical handle controllability and stability tests on both dry and wet roads.

The tires used were of well-known radial structure type. The road was a 2.3 km round asphalted test course, and the cars were driven in slalom fashion at a speed of about 100 km/h in dry condition and at a speed of 70 km/h in wet condition.

TEST A

The tread pattern of test tires was that as shown in FIG. 1. In test, the tires were mounted on the cars in such a way that the tread area O of the tire pattern is located on the outside of four front and rear, right and left wheels of the test car, and further the innermost ends $2a$ and $3a$ (near the main circumferential groove 1) of the inclination grooves 2 or 3 are first brought into contact with the road before the outer ends $2b$ and $3b$ (near the tread end e) of the inclination grooves are in contact with the road when the tire wheels are rotating. For doing this, it was necessary to prepare two different tires having different patterns for use only for right or left wheels, separately.

Dimensions of tread pattern of test tires:
Tread width: 160 mm
Width of main groove 1: 14 mm
Width of inclination grooves 2: 5 mm (on average)
Angle $\alpha_1$ of inclination grooves 2: 25°
Width of inclination grooves 3: 4 mm (on average)
Angle $\alpha_2$ of inclination grooves 3: 45°

Width of auxiliary grooves 6 and 7: 2 mm
Width of intermediate groove 8: 3 mm
Pitch length $P_1$: 70 mm
Pitch length $P_2$: 30 mm ($P_1/P_2=2.3$)
Groove depth: 8 mm (the same in all)

TEST B

The test tires were mounted on the test cars in such a way that the area I of the tires was located on the outside of four front and rear, right and left wheels of the test car. Other test conditions were the same as in Test A.

TEST C

The test tires were mounted on the test cars in such a way that the area I of the tires was located on the outside of both front, right and left wheels, but the area O of the tires was located on the outside of both rear, right and left wheels. Other test conditions were the same as in Test A.

TEST D

Prior-art test tires formed in such a way that the main circumferential groove is arranged with the center thereof located on the tire equator, and the inclination grooves as shown in the area I are formed in symmetry with respect to the tire equator were mounted on four front and rear wheels of test cars.

TEST E

Prior-art test tires formed in such a way that the main circumferential groove is arranged with the center thereof located on the tire equator, and the inclination grooves as shown in the area O are formed in symmetry with respect to the tire equator were mounted on four front and rear wheels of test cars.

TEST RESULTS

The table below shows these test results in the form of indices. The larger the indices are, the better will be the steering controllability and stability.

|  | Invention Tires | | | Prior-art Tires | |
| --- | --- | --- | --- | --- | --- |
|  | Test A | Test B | Test C | Test D | Test E |
| Dry road | 100 | 98 | 98 | 94 | 100 |
| Wet road | 99 | 99 | 99 | 100 | 95 |

The above table indicates that the prior-art tires (Test D) are good on wet road but poor on dry road, and the prior-art tires (Test E) are good on dry road but poor on wet road. In contrast with this, the tires of the present invention are excellent in both wet and dry roads. In particular, the tires (Test A) where the area O of the tire pattern are located on the outside of four front and rear, right and left wheels of the test car indicate excellent steering controllability and stability.

What is claimed is:

1. A pneumatic radial tire having a radial carcass extending between two tire sidewalls through a tire crown portion in toroidal shape; a belt layer arranged along an outer circumferential of a crown portion of the carcass; and a tread formed with at least one main circumferential groove located at a central portion of the tread substantially in parallel to a tire equator, a plurality of inclination grooves arranged on both sides of a tire tread at substantially regulr intervals along a tire circumference and extending from both tread ends toward the main circumferential groove to form an acute angle with a line parallel to the tire equator, each of said first and second inclination grooves increasing in width toward respective tread ends, and tire land portions partitioned by the main groove and said inclination grooves, wherein a ratio of $P_1/P_2$ lies within a range between 1.5 and 3.0 and $\alpha_2$ is greater than $\alpha_1$, where: $P_1$ denotes a first circumferential pitch length of said first inclination groove and, where, $\alpha_1$ denotes a first average inclination angle of first inclination grooves with respect to said line parallel to the tire equator both in a first tire tread area defined between the main circumferential groove and a first tread end; and $P_2$ denotes a second circumferential pitch length of second inclination grooves and $\alpha_2$ denotes a second average inclination angle of said second inclination grooves with respect to said line parallel to the tire equator both in a second tire tread area defined between the main circumferential groove and a second tread end where $P_1$ and $P_2$ are measured at the tread edge in the circumferential direction from the edge of one groove to the same edge on an adjacent groove.

2. The pneumatic radical tire as set forth in claim 1, wherein the first average inclination angle $\alpha_1$ lies between 15 to 40 degrees and the second average inclination angle $\alpha_2$ lies between 25 and 80 degrees.

3. The pneumatic radial tire as set forth in claim 1, wherein a land portion (4 or 5) is formed, respectively between the main circumferential groove (1) and an axially innermost end (2a or 3a) of the inclination grooves (2 or 3) in each of the first and second tire tread areas (O and I).

4. The pneumatic radial tire as set forth in claim 3, wherein a relatively-narrow auxiliary groove (6 or 7) parallel to the main circumferential groove is formed in the land (4, 5) formed between the main circumferential groove (1) and the axially innermost end (2a or 3a) of the inclination grooves (2 or 3) in each of the first and second tire trad areas (O, I).

5. The pneumatic radial tire as set forth in claim 1, wherein said main circumferential groove (1) is formed being offset from the tire equator toward the first tire tread are (O) in such a way that one inner wall of the main circumferential groove is located substantially at the tire equator.

6. The pneumatic radial tire as set forth in claim 1, wherein a relatively-narrow intermediate circumferential groove (8) is formed in the second tire tread are (I) in parallel to the main circumferential groove so as to substantially bisect the second tire tread area (I) and divide the inclination grooves (3) along the tire axial direction.

7. The pneumatic radial tire as set forth in claim 6, wherein two respective inclination grooves bisected by the intermediate circumferential groove (8) are offset from each other at each divided position with an offset distance of 0.25 to 1.0 of an inclination groove width.

* * * * *